US011710976B2

(12) United States Patent
Pons et al.

(10) Patent No.: US 11,710,976 B2
(45) Date of Patent: Jul. 25, 2023

(54) USB-PD SUPPLY INTERFACE AND ASSOCIATED METHOD

(71) Applicants: STMicroelectronics (Alps) SAS, Grenoble (FR); STMicroelectronics (Grenoble 2) SAS, Grenoble (FR)

(72) Inventors: Alexandre Pons, Vizille (FR); Jean Camiolo, St. Egreve (FR); Meriem Mersel, Saint-Etienne (FR)

(73) Assignees: STMICROELECTRONICS (ALPS) SAS, Grenoble (FR); STMICROELECTRONICS (GRENOBLE 2) SAS, Grenoble (FR)

( * ) Notice: Subject to any disclaimer, the term of this patent is extended or adjusted under 35 U.S.C. 154(b) by 316 days.

(21) Appl. No.: 17/187,478

(22) Filed: Feb. 26, 2021

(65) Prior Publication Data

US 2021/0273548 A1    Sep. 2, 2021

(30) Foreign Application Priority Data

Feb. 28, 2020    (FR) ...................... 2002010

(51) Int. Cl.
*H02J 7/00* (2006.01)
*H02M 1/08* (2006.01)

(52) U.S. Cl.
CPC .... *H02J 7/00712* (2020.01); *H02J 7/007192* (2020.01); *H02J 2207/20* (2020.01); *H02J 2207/30* (2020.01)

(58) Field of Classification Search
CPC ............ H02J 7/00712; H02J 7/007192; H02J 2207/20; H02J 2207/30
See application file for complete search history.

(56) References Cited

U.S. PATENT DOCUMENTS

| 2007/0001646 | A1* | 1/2007 | Kojima | H02J 5/00 320/128 |
|---|---|---|---|---|
| 2012/0229090 | A1 | 9/2012 | Arai et al. | |
| 2017/0040812 | A1 | 2/2017 | Li et al. | |
| 2017/0201107 | A1 | 7/2017 | Yang et al. | |
| 2020/0006977 | A1 | 1/2020 | Uchida | |
| 2021/0242679 | A1 | 8/2021 | Tailliet | |

FOREIGN PATENT DOCUMENTS

| EP | 2800235 A1 | 4/2012 | |
|---|---|---|---|
| EP | 2515422 A1 * | 10/2012 | ............ H02M 3/156 |

* cited by examiner

*Primary Examiner* — Drew A Dunn
*Assistant Examiner* — Pamela J Jeppson
(74) *Attorney, Agent, or Firm* — Slater Matsil, LLP (57) ABSTRACT

An embodiment of the present disclosure relates to a power supply interface comprising: a converter delivering a first DC voltage; a resistor connected between the converter and an output terminal of the interface delivering a second DC voltage; a first circuit delivering a second signal representative of a difference between the second DC voltage and a voltage threshold when a first signal is in a first state, and at a default value otherwise; a second circuit delivering a third signal representative of a value of a current in first resistor multiplied by a gain of the third circuit, and modifying the gain based on the second signal; and a third circuit configured to deliver a signal for controlling the converter based at least on the third signal.

20 Claims, 5 Drawing Sheets

USB-PD SUPPLY INTERFACE AND ASSOCIATED METHOD

CROSS-REFERENCE TO RELATED APPLICATIONS

This application claims the benefit of U.S. Provisional Application No. 2002010, filed on Feb. 28, 2020, which application is hereby incorporated herein by reference.

TECHNICAL FIELD

The present disclosure relates generally to interfaces powering a load from a power source, and associated methods. The application more particularly relates to a power supply interface connected between a power source and a USB-C-type connector, the connector being intended to be electrically coupled to a load to be powered, particularly by a USB-C-type cable, and an associated method.

BACKGROUND

Although, currently, wireless connection is one of the main research axes in the field of power and data exchange, cables still seem to be the most reliable way to connect a plurality of electronic devices, be it to exchange data or to power or charge one or a plurality of electronic devices.

Among the different types of cables and connectors of the USB ("Universal Serial Bus") standard, the USB-C type enables the exchange of data and power. The USB-PD technology ("USB Power Delivery") is a technology which is adapted to USB-C-type cables and connectors. Such a technology enables management of the powering of electronic devices.

SUMMARY

It would be desirable to be able to at least partly improve certain aspects of interfaces powering a load from a power source, in particular power supply interfaces adapted to the USB-PD technology.

An embodiment overcomes all or part of the disadvantages of the interfaces powering a load from a power source, in particular, of power supply interfaces adapted to the USB-PD technology.

One embodiment provides a power supply interface comprising:
a converter configured to receive a power supply voltage, the converter comprising a first terminal configured to deliver a first DC voltage;
a first resistor and a first switch in series between the first terminal and an output terminal of the interface configured to deliver a second DC voltage;
a first circuit configured to receive a first signal and to deliver a second signal representative of a difference between the second voltage and a voltage threshold when the first signal is in a first state, and at a default value when the first signal is in a second state;
a second circuit configured to deliver a third signal representative of a value of a first current in the first resistor multiplied by a gain of the third circuit, and to modify the gain based on the second signal; and
a third circuit configured to deliver a signal for controlling the converter based on a current threshold, on a first target value of the second voltage, on a current value of the second voltage, and on the third signal.

According to one embodiment, the interface comprises a fourth circuit configured to deliver the first signal in the first state for a predetermined time period after the second voltage reaches the voltage threshold and/or if a temperature in the interface is lower than a maximum temperature, and in the second state otherwise.

According to one embodiment, the fourth circuit comprises: a counter configured to count during the predetermined time period after a switching of a signal for starting the counter, and to switch an output signal of the counter once the predetermined time period has elapsed, and a comparator of a signal representative of the voltage threshold and of a signal representative of the current value of the second voltage, configured to deliver the starting signal; and/or
a comparator of a signal representative of the maximum temperature and of a signal representative of the temperature in the interface configured to deliver a signal representative of the comparison,
the first signal being determined from the output signal of the counter and/or from the signal representative of the comparison.

According to one embodiment, the interface is intended to power a load, the interface being configured to negotiate a power to be delivered to the load, selectable from a predefined list of powers, the negotiated power determining the current threshold, the first target value, and the voltage threshold.

According to one embodiment, the negotiated power also determines the predetermined time period and/or the maximum temperature.

According to one embodiment, the first, second, and third circuits are configured so that, when the first signal is in the first state, the control signal of the converter is such that the current value of the second voltage remains greater than or equal to the voltage threshold.

According to one embodiment, the third circuit comprises:
a fifth circuit configured to deliver, based on the third signal, a fourth signal representative of a difference between the current threshold multiplied by a default value of the gain of the second circuit and the value of the first current multiplied by the gain of the second circuit;
a sixth circuit configured to deliver a fifth signal representative of a second target value equal to the first target value modulated by the fourth signal; and
a seventh circuit configured to deliver the control signal based on a difference between the second target value and the current value of the second voltage.

According to one embodiment, the sixth circuit comprises a second resistor connected between a first node configured to receive a seventh signal representative of the first target value and a second node configured to deliver the fifth signal, and a first transistor connected between the second node and a third node of application of a reference potential, a control terminal of the transistor being configured to receive the fourth signal.

According to one embodiment, the first circuit comprises:
a first assembly comprising a third resistor and a switch connected in parallel, a control terminal of the switch being configured to receive the first signal;
an eighth circuit configured to deliver to the first assembly a second current determined by the fourth signal; and
a ninth circuit configured to deliver the second signal based on a voltage across the third resistor and on a signal representative of a difference between the first target value and the voltage threshold.

According to one embodiment, the second circuit comprises:
an operational amplifier;
a fourth resistor connected between a terminal of the first resistor coupled to the converter and a first input of the operational amplifier, a second input of the operational amplifier being coupled to a further terminal of the first resistor coupled to the output terminal of the interface;
a second assembly comprising a second transistor, a fifth resistor and a sixth resistor series-connected between the first input of the amplifier and a node of application of a reference potential; and
a third transistor connected in parallel with the sixth resistor and having a control terminal configured to receive the second signal,
the second transistor having a control terminal coupled, preferably connected, to an output of the amplifier, a first conduction terminal coupled, preferably connected, to the first input of the amplifier, and a second conduction terminal configured to deliver the third signal.

A further embodiment provides a method implemented in a power supply interface comprising a converter receiving a power supply voltage and having a first terminal delivering a first DC voltage, and a first resistor and a first switch in series between the first terminal and an output terminal of the interface delivering a second DC voltage, the method comprising:
a) delivering, with a first circuit of the interface receiving a first signal, a second signal representative of a difference between the second voltage and a voltage threshold when the first signal is in a first state, and at a default value when the first signal is in a second state;
b) delivering, with a second circuit of the interface, a third signal representative of a first current in the first resistor multiplied by a gain of the second circuit;
c) modifying the gain of the second circuit based on the second signal; and
d) delivering, with a third circuit of the interface, a signal for controlling the converter determined based on a current threshold, on a first target value of the second voltage, on a current value of the second voltage, and on the third signal.

According to one embodiment, the first signal is in the first state during a predetermined time period after the second voltage reaches the voltage threshold and/or if a temperature in the interface is lower than a maximum temperature, and in the second state otherwise.

According to one embodiment, during a negotiation with a load to be powered coupled to the interface, the interface selects a power from a predefined list of powers, the negotiated power determining the current threshold, the first target value, the voltage threshold, and, preferably, the predetermined time period and/or the maximum temperature.

According to one embodiment, when the first signal is in the first state, the third circuit controls the converter so that the current value of the second voltage remains greater than or equal to the voltage threshold.

According to one embodiment, the control signal is determined based on a difference between a second target value and the current value of the second voltage, and wherein the second target value is equal to the first target value modulated based on a difference between the third signal and a signal representative of the current threshold multiplied by a default value of the gain of the second circuit.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

The Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the various devices and applications where a power supply interface, typically a power supply interface configured to implement the USB-PD technology, may be provided, have not been described, the described embodiments being compatible with such usual devices and applications. Further, the management of a negotiation phase concerning the supply power that an interface is supposed to deliver to a load from a power source is not detailed. Further, only the relevant aspects of the USB-C and USB-PD technologies are described, the other aspects adapting with no modifications. In particular, the function of data exchange via USB-C connectors adapted to the USB-PD technology, and possibly a USB-C-type cable adapted to the USB-PD technology, is not described, the described embodiments being compatible with the usual data exchange function of the USB-C and USB-PD technologies.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
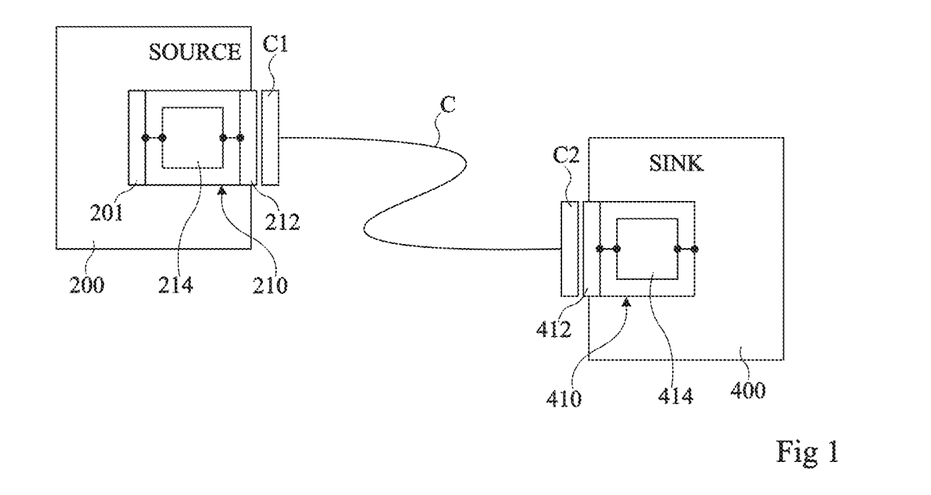
FIG. 1 is a simplified view illustrating an embodiment of the delivery of a supply power to a load, via a power supply interface according to an embodiment, the interface coupling the load and a power source.

FIG. 1 is a simplified view illustrating an embodiment of the delivery of a supply power to a device 400 having the role of a load (SINK) to be powered, via a power supply interface 214 according to an embodiment.

Power supply interface 214, also named connection interface 214, belongs to a device 200 having the role of a power source (SOURCE) and couples load 400 with a power source 201 of device 200. In the example of FIG. 1, devices 200 and 400 are connected via a C cable of USB-C type, in the present example adapted to the USB-PD technology.

The power source 201 of device 200 is for example the mains or a DC power supply. In the following description, it is considered that device 200 comprises a DC power source 201, device 200 being for example a computer, a portable battery, etc. or any other electronic device capable of powering a device and/or of charging a battery.

Cable C comprises, at each of its ends, a USB-C-type connector C1, C2, in the present example adapted to the USB-PD technology. Connectors C1, C2 may be identical.

A connection element 210, respectively 410, comprising a connection interface 214, respectively 414, and a connector 212, respectively 412, is arranged on the side of device 200, respectively of device 400. Interface 214, respectively 414, couples power source 201, respectively load 400, to connector 212, respectively 412. Preferably, it is considered that connection elements 210, respectively 410, form part of power supply device 200, respectively of load 400. Each connector 212, 412 is configured to cooperate with a connector C1, C2 of cable C. Interfaces 214, 414 may be identical. Interfaces 214, 414 enable adapting of the supply power delivered by power source 201 according to the supply power required by load 400. More particularly, in the following description, interfaces 214, 414 enable adapting the supply power delivered by power source 201 according to a set point supply power required by load 400, particularly in the case where the USB-PD technology is implemented. To achieve this, interface 214 comprises a power converter (not shown in FIG. 1), for example, a DC/DC voltage converter when power source 201 is a source of a DC voltage, controlled to adapt, from power source 201, the delivered supplied to load 400.

During a connection managed by the USB-PD technology, interface 214 is configured to deliver a power supply voltage Vbus (not shown in FIG. 1) to load 400, voltage Vbus first having a default value, for example, 5 V. Then, a communication is established between devices 200 and 400 to decide of the electric supply power necessary for device 400 to be powered and/or charged. More particularly, device 400 indicates, for example, via its interface 414, the minimum power required for its operation and device 200 indicates, for example, via its interface 214, the supply powers that it is capable of delivering. A negotiation managed, in the present example, by the USB-PD technology, and then starts in order to define what power will be delivered by device 200 to device 400.

The negotiated supply power is selected from a predefined list of supply powers. The list is for example recorded in interface 214. Preferably, the list is defined by a standard. Each supply power in the list is characterized by a plurality of values, particularly by a target value Vtarget of a voltage Vbus (not shown in FIG. 1) that device 200 is supposed to deliver to load 400 and by a current threshold Ith, or maximum current, that load 400 is allowed to draw from device 200. In the USB-PD technology, each set of values characterizing a predefined supply power in the list corresponds to a set of information designated by initials PDO ("Power Delivery Output"), where such PDO sets of information can be transmitted between devices 200 and 400 adapted to the USB-PD technology to define, during a negotiation, which of the predefined powers should be delivered by device 200 to load 400

Once the negotiation is ended, connection interface 214 adapts the supply power of power source 201 according to the result of the negotiation, after which the power supply of device 400 starts. The voltage converter of interface 214 is then controlled in accordance with the result of the negotiation, to adapt the power of power source 201 to the negotiated power.

In particular, as long as a current I (not shown in FIG. 1) drawn by load 400 is smaller than the current threshold Ith corresponding to the negotiated power, interface 214 controls its converter, via a control signal cmd (not shown in FIG. 1), so that the voltage Vbus delivered to load 400 is equal to the target voltage Vtarget corresponding to the negotiated power. Said otherwise, the voltage Vbus is regulated to the value Vtarget. This operation is called constant voltage operation. For this purpose, interface 214 comprises a voltage feedback loop configured to deliver control signal cmd to the converter and, more precisely, to adapt or modify signal cmd based on the target value Vtarget and the voltage Vbus effectively delivered by device 200.

Further, when the current I drawn by the load 400 increases and reaches the current threshold Ith corresponding to the negotiated power, interface 214 is configured to adapt or modify signal cmd so that the delivered voltage Vbus decreases and the current I is regulated to the value Ith. This allows avoidance of device 200 delivering a power greater than the negotiated power. This operation is currently called constant current operation. For this purpose, interface 214 comprises a current feedback loop configured to modify, preferably to decrease, a target voltage value effectively received by the voltage feedback loop, which results in a corresponding modification of control signal cmd. In other words, the current feedback loop is configured to deliver, to the voltage feedback loop, a target voltage value Vtarget' corresponding to target value Vtarget modified based on a signal Isens of measure of the current I and threshold Ith, such that the measured value of the current I is regulated, or is equal, to the value of the threshold Ith. The current feedback loop typically comprises an amplifier circuit configured to deliver the signal Isens (not shown in FIG. 1), the signal Isens being representative of current I multiplied by a gain G of the amplifier circuit.

However, the interface 214 of device 200 and the interface 414 of device 400 each comprise a switch configured to interrupt the electric coupling between power source 201 and connection element 212, respectively between connection element 414 and circuits to be powered of load 400, when voltage Vbus reaches an under voltage lock-out threshold or UVLO threshold. The UVLO threshold is for example determined based on the target value Vtarget corresponding to the negotiated power, and is lower than the value Vtarget. The UVLO threshold is for example equal to a percentage, for example 90%, of value Vtarget. After such a disconnection, interface 214 controls its converter so that voltage Vbus recovers is default value, and then a new negotiation phase is implemented between device 200 and 400.

The UVLO lock-out threshold raises an issue, particularly when, after the new negotiation phase, load 400 draws a current I greater than threshold Ith again and voltage Vbus decreases until reaching the UVLO threshold again. Indeed, devices 200 and 400 may then enter an endless loop alternating between interruptions of the electric coupling between devices 200 and 400 and supply power renegotiation phases. Such an unwanted operation may for example be observed when the power received by interface 414 is used to charge a battery or a capacitor of interface 414, fully discharged at the time when device 200 starts delivering the negotiated power to load 400. Such an unwanted operation may also be observed for example when the power received by interface 414 is directly delivered to a circuit of load 400, with no intermediate power converter.

According to an embodiment, the inventors provide for interface 214 to comprise a circuit configured to control a modification of gain G of the amplifier circuit providing the signal Isens, as long as an internal signal EN (not shown in FIG. 1) of interface 214 is in a first state, and to avoid modifying gain G when signal EN is in a second state, gain G being then equal to a default value Ginit. The signal EN is for example a binary signal with two states, that is, a high state and a low state. The inventors provide that the gain G is modified based on a difference between a voltage threshold Vth and the voltage Vbus, that is to say that the gain is modified based on the value of the voltage Vbus and the value of threshold Vth. More particularly, the inventors provide that, as long as signal EN is in the first state, gain G is modified so that voltage Vbus is regulated to the value of the threshold Vth when current I is greater than or equal to threshold Ith.

According to an embodiment, the threshold Vth is in the range from the target value Vtarget to the threshold UVLO. Thus, when signal En is in the first state, voltage Vbus is regulated to the value Vth greater than the value of the threshold UVLO. As an example, voltage threshold Vth is slightly greater than the UVLO threshold, and is for example in the range from 91% to 95% of target value Vtarget.

According to an embodiment, signal EN is in the first state for a predetermined time period Ti after voltage Vbus reaches threshold Vth, and in the second state otherwise. Time period Ti is for example a time period beyond which interface 214 may be damaged or destroyed if interface 214 kept on delivering a power greater than the negotiated power. Time period Ti is longer than the possible previously-mentioned delay period. It will be within the abilities of those skilled in the art to determine time period Ti.

According to an embodiment, signal EN is in the first state as long as a temperature T in interface 214 is lower than a maximum temperature Te, and in the second state otherwise. Temperature Te is for example a maximum temperature of interface 214 above which interface 214 might be damaged or destroyed. In practice, the time period for which signal EN remains in the first state is then longer than the possible previously-mentioned delay period. It will be within the abilities of those skilled in the art to determine temperature Te.

According to another embodiment, corresponding to a combination of the two above embodiments, signal EN is in the first state during time period Ti after voltage Vbus reaches threshold Vth, and if temperature T in interface 214 is lower than temperature Te, and in the second state otherwise. More precisely, in this embodiment, signal EN is in the second state if temperature T is greater than Te or if time period Ti has elapsed.

Interface 214 enables, when signal EN is in the first state, to deliver a voltage Vbus greater than the UVLO threshold whatever the current I drawn by the load or, in other words, to deliver a power greater than the negotiated power. This may enable starting of the charge of a fully discharged capacitor or battery of load 400, so that, at the time when signal EN switches to its second state, the current I drawn by load 400 has a value such that voltage Vbus is above the UVLO threshold. In other words, interface 214 enables delivering as required a supply power greater than a negotiated power, which enables not to uselessly interrupt the power supply of load 400 by device 200. The delivery of such a greater power is conditioned by the state of signal EN, which enables protecting interface 214 by stopping the delivery of such a greater power before interface 214 is deteriorated or destroyed.

Figure 2:
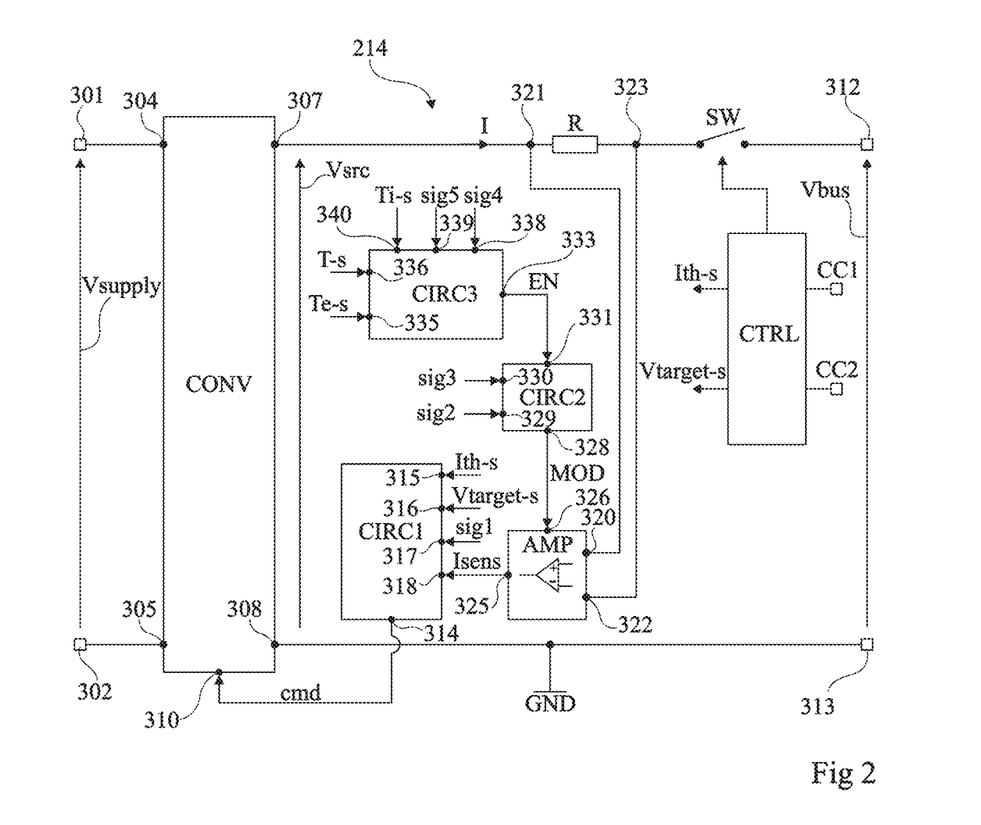
FIG. 2 is a simplified view illustrating an embodiment of the power supply interface of FIG. 1.

FIG. 2 is a simplified view illustrating an embodiment of the power supply interface 214 of FIG. 1.

Interface 214 comprises two input terminals 301 and 302 intended to receive a power supply voltage Vsupply from power source 201 (not shown in FIG. 2). Voltage Vsupply is for example a DC voltage.

Interface 214 comprises a voltage converter CONV, or power converter, having two input terminals 304 and 305 coupled, preferably connected, to the respective terminals 301 and 302.

Converter CONV comprises an output terminal 307 configured to supply a DC voltage Vsrc, voltage Vsrc being for example referenced to another output terminal 308 of converter CONV, terminal 308 being set to a reference potential GND, typically the ground.

Converter CONV is controlled by control signal cmd, signal cmd being received by a terminal 310 of converter CONV. More particularly, signal cmd determines a value of voltage Vsrc that converter CONV should deliver.

Interface 214 comprises a resistor R and a switch SW series-connected between terminal 307 and an output terminal 312 of interface 214. Terminal 312 is configured, when switch SW is on, to deliver DC voltage Vbus, for example, referenced to an output terminal 313 of interface 214 set to reference potential GND, terminal 313 being coupled, preferably connected to terminal 308 of converter CONV. The value of voltage Vbus is determined by that of voltage Vsrc, and thus by signal cmd.

Resistor R is coupled, preferably connected, to terminal 308, switch SW being coupled, preferably connected, to terminal 312. Switch SW is configured, when it is in the off state, to electrically isolate terminal 312 from terminal 307 or, in other words, to interrupt the power supply of a load coupled to interface 214.

Interface 214 comprises a circuit CTRL. Circuit CTRL is a circuit for controlling interface 214. Circuit CTRL comprises at least one terminal coupled, preferably connected, to at least one communication terminal of interface 214. The output and communication terminals of interface 214 are all intended to be coupled to the corresponding connector 212 (not shown), which then allows the coupling with device 400 (FIG. 1), for example, via connector C1, cable C, and connector C2 as shown in FIG. 1. In this embodiment, interface 214 comprises two communication terminals CC1, CC2 coupled, preferably connected, each to a corresponding terminal of circuit CTRL. An advantage of having two communication terminals is that, in the case where the terminals are symmetrically positioned on connector 212, this enables manufacture of a reversible connector C1, that is, a connector C1, for example, rectangular, which may be coupled to connector 212 in a first direction and in a second direction opposite to the first direction. During a phase of renegotiation of a supply power, the communication between interface 214 and a load to be powered is generally at least partly implemented by circuit CTRL, via the communications terminals CC1 and CC2 of interface 214.

Circuit CTRL is configured to control switch SW, in particular to turn off switch SW when voltage Vbus reaches the UVLO threshold. As a non-illustrated example, for this purpose, circuit CTRL is configured to receive an output signal of a comparator (not shown), the comparator comparing a signal representative of voltage Vbus with a signal representative of the UVLO threshold, and to control switch SW based on the output signal of the comparator. The signal representative of the UVLO threshold (not shown) is for example delivered by circuit CTRL, circuit CTRL being for example configured to adapt a value of the UVLO threshold according to a supply power negotiated with a load.

Once a supply power has been negotiated, circuit CTRL is further configured to deliver a signal Ith-s representative of the current threshold Ith corresponding to the negotiated power, and a signal Vtarget-s representative of the target value Vtarget of voltage Vbus corresponding to the negotiated power.

Interface 214 comprises a circuit CIRC1. The circuit CIRC1 is configured to deliver signal cmd to converter CONV. Circuit CIRC1 comprises a terminal 314 configured to deliver signal cmd, terminal 314 being coupled, preferably connected, to the terminal 310 of converter CONV. Although this is not shown in FIG. 1, interface 214 may comprise a driver coupling terminal 314 to terminal 310, the driver being configured to shape signal cmd. As an example, the driver may comprise optical couplers to transmit signal cmd from terminal 314 to terminal 310.

Circuit CIRC1 is configured to provide the signal cmd so that voltage Vbus is regulated to the target value Vtarget', or, said otherwise, is equal to the value Vtarget'. Circuit CIRC1 is configured to determine the value Vtarget' and the corresponding signal cmd from or based on signal Ith-s, signal Vtarget-s, a signal sig1 representative of voltage Vbus, and signal Isens of measure of current I. More particularly, signals Ith-s, Vtarget-s, sig1, and Isens are delivered to respective terminals 315, 316, 317, and 318 of circuit CIRC1.

Interface 214 comprises a circuit AMP configured to deliver signal Isens.

Circuit AMP is configured so that the signal Isens, typically a voltage, is representative of a value of current I in resistor R multiplied by gain G of circuit AMP. Said otherwise, circuit AMP is configured so that signal Isens is representative of the current I multiplied by gain G. Thus, in this embodiment, circuit AMP comprises a terminal 320 coupled, preferably connected, to a terminal 321 of resistor R coupled to converter CONV, and a terminal 322 coupled, preferably connected, to a terminal 323 of resistor R coupled to switch SW. Signal Isens is delivered by a terminal 325 of circuit AMP coupled, preferably connected, to terminal 318 of circuit CIRC1.

Circuit AMP is further configured to modulate, or adapt or modify, its gain G according to a signal MOD. Circuit AMP comprises a terminal 326 configured to receive signal MOD.

More particularly, according to an embodiment, when signal MOD is at a default value, gain G of circuit AMP is at a default value Ginit and, when signal MOD is not at its default value, gain G of circuit AMP is modified, preferably decreased, based on signal MOD, that is, based on a value of signal MOD. As an example, when gain G of circuit AMP has a value lower than its default value Ginit, circuit CIRC1 operates as if current I in resistor R was smaller than it really is. Thus, circuit CIRC1 delivers a control signal cmd so that voltage Vsrc, and thus voltage Vbus, has a higher value than if gain G had been at its default value.

Interface 214 comprises a circuit CIRC2 configured to deliver signal MOD to circuit AMP. Circuit CIRC2 comprises a terminal 328 coupled, preferably connected, to terminal 326 of circuit AMP, terminal 328 being configured to deliver signal MOD.

Circuit CIRC2 is under control of signal EN, for example, a binary signal taking two states, high and low. Circuit CIRC2 comprises a terminal 331 configured to receive le signal EN.

When signal EN is in a first state, for example, the low state, circuit CIRC2 is configured to deliver signal MOD so that it is representative of a difference between voltage Vbus and voltage threshold Vth. Circuit CIRC2 then comprises a terminal 329 configured to receive a signal sig2 representative of voltage Vbus, and a terminal 330 configured to receive a signal sig3 representative of voltage threshold Vth. Further, when signal EN is in a second state, for example, the high state, circuit CIRC2 is configured to deliver signal MOD at its default value. As an example, when signal EN is in the first state, the smaller the difference between voltage Vbus and voltage Vth, the more a value of signal MOD increases with respect to its default value, and the more gain G of circuit AMP decreases with respect to its default value Ginit.

Interface 214 comprises a circuit CIRC3 configured to deliver signal EN. Circuit CIRC3 comprises a terminal 333 configured to deliver signal EN, terminal 333 being coupled, preferably connected, to terminal 331 of circuit CIRC2.

In the embodiment illustrated in FIG. 2, circuit CIRC3 is configured to deliver signal EN in its first state during predetermined time period Ti from a time when voltage Vbus reaches threshold Vth and if the temperature T in interface 214 is smaller than temperature Te, and in the second state otherwise. Circuit CIRC3 then comprises an optional terminal 335 configured to receive a signal Te-s representative of temperature Te, and a terminal 336 configured to receive a signal T-s representative of temperature T. Circuit CIRC3 further comprises a terminal 338 configured to receive a signal sig4 representative of voltage Vbus, a terminal 339 configured to receive a signal sig5 representative of voltage threshold Vth and, optionally, a terminal 340 configured to receive a signal Ti-s representative of time period Ti.

In an embodiment where circuit CIRC3 is configured to receive signal Ti-s, time period Ti is for example adapted based on the negotiated power, signal Ti-s being for example delivered by circuit CTRL. Time period Ti is for example all the shorter as the negotiated power is high. Similarly, in an embodiment where circuit CIRC3 is configured to receive signal Te-s, it may be provided for temperature Te to be adapted based on the negotiated power.

Although this is not detailed, it will be within the abilities of those skilled in the art to adapt the above description of circuit CIRC3 to the embodiment where temperature T is not taken into account to determine the state of signal EN, or to the embodiment where only temperature T in interface 214 is taken into account to determine the state of signal EN.

In interface 214, the previously-mentioned feedback loop is implemented by circuit CIRC1. Indeed, as long as current I is smaller than current threshold Ith (constant voltage operation), circuit CIRC1 adapts signal cmd according to the difference between voltage Vbus and set point value Vtarget, so that the converter delivers voltage Vbus at value Vtarget. More precisely, circuit CIRC1 knows the current threshold due to the signal Ith-s that it receives, and determines the difference between voltage Vbus and its set point value from the signals Vtarget-s and sig1 that it receives.

Further, in interface 214, the previously-mentioned current feedback loop is implemented by circuits CIRC1 and AMP, the gain of this current feedback loop being controlled by the circuit CIRC2. Indeed, when current I reaches current threshold Ith and tends to exceed this threshold (constant current operation), the target value Vtarget of voltage Vbus is adapted, by circuit CIRC1, based on the signal Isens, so that the value of the product G*I is equal to the one of the product Ginit*Ith. Thus, as long as signal EN is in its second state and gain G is thus at its default value Ginit, current I is regulated to the value Ith. In addition, when the signal EN is in its first state, gain G is modulated by circuit CIRC2, so that the value Vtarget' does not become lower than the value of the threshold Vth. Said otherwise, the gain G is modified so that voltage Vbus does not become lower than the threshold Vth. Current I is then regulated to a value (Ginit*Ith)/G, which is greater than threshold Ith when gain G is lower than its default value Ginit. Said otherwise, the current feedback loop tends to impose that the product G*I is equal to the product Ginit*Ith.

Thus, circuits CIRC1, AMP, and CIRC2 are configured so that voltage Vbus remains greater than or equal to threshold Vth whatever the value of current I when signal EN is in the first state. More particularly, circuits CIRC1, AMP and CIRC2 are configured to regulate voltage Vbus to the value of the threshold Vth when current I is greater than or equal to the threshold Ith and the signal EN is in the first state.

Figure 3:
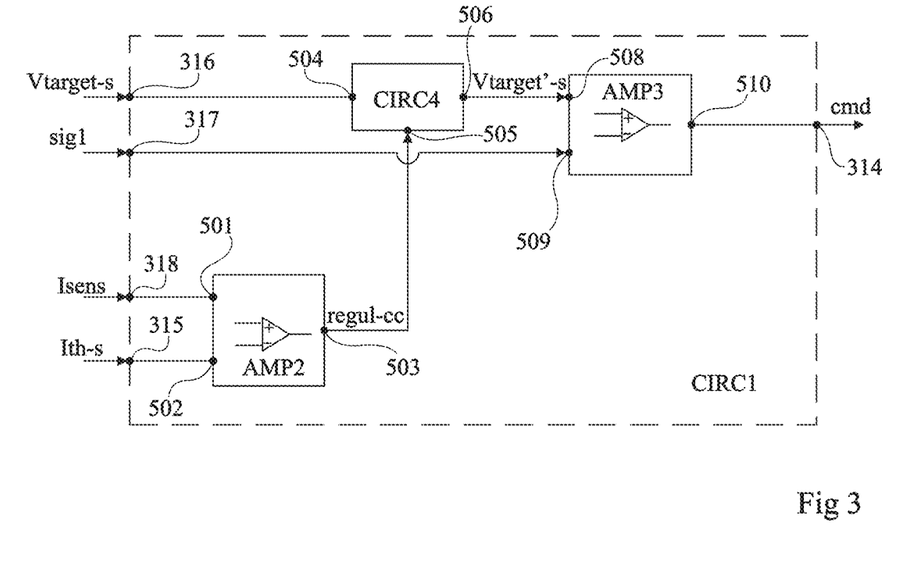
FIG. 3 shows an embodiment of a circuit of the interface of FIG. 2.

FIG. 3 shows an embodiment of circuit CIRC1 of interface 214 of FIG. 2.

In this embodiment, circuit CIRC1 comprises a circuit AMP2 configured to deliver, based on signal Isens and signal Ith-s, a signal regul-cc. Signal regul-cc is configured to determinate a difference between target values Vtarget and Vtarget', so that signals Isens and Ith-s are equal, thus, so that products G*I and Ginit*Ith are equal. Said otherwise, signal regul-cc is representative of a difference between product G*I and product Ginit*Ith, the value Vtarget' being modified based on the signal regul-cc so that this difference becomes null. As an example, when gain G has its default value Ginit and current I reaches threshold Ith, signal regul-cc determine the value Vtarget' so that Ginit*Ith is equal to G*I, that is to say the value Vtarget' such that current I is regulated to the value of threshold Ith.

As an example, circuit AMP2 comprises:
an input terminal 501 configured to receive signal Isens, terminal 501 being coupled, preferably connected, to terminal 318 of circuit CIRC1;
an input terminal 502 configured to receive signal Ith-s representative of threshold Ith, terminal 502 being coupled, preferably connected, to terminal 315 of circuit CIRC1; and
a terminal 503 configured to deliver signal regul-cc.

In this embodiment, circuit CIRC1 further comprises a circuit CIRC4 configured to deliver a signal Vtarget'-s representative of the target value Vtarget' of voltage Vbus. The value Vtarget' is determinate from the value Vtarget and signal regul-cc. More particularly, the value Vtarget' is equal to target value Vtarget modulated or modified by signal regul-cc, values Vtarget and Vtarget' being equal when the interface operate in constant voltage operation. As being previously indicated, value Vtarget' is determinate based on signal regul-cc so that, in constant current operation and when the current I reaches threshold Ith, products G*I and Ginit*Ith are equal.

As an example, circuit CIRC4 comprises:
an input terminal 504 configured to receive signal Vtarget-s representative of value Vtarget, terminal 504 being coupled, preferably connected, to terminal 316 of circuit CIRC1; an input terminal 505 configured to receive signal regul-cc, terminal 505 being coupled, preferably connected, to terminal 503 of circuit AMP2; and
an output terminal 506 configured to deliver signal Vtarget'-s representative of value Vtarget'.

In this embodiment, circuit CIRC1 comprises a circuit AMP3 configured to generate control signal cmd based on a difference between reference value Vtarget' and the value of voltage Vbus. More particularly, circuit AMP3 is configured to generate signal cmd from signal Vtarget'-s representative of value Vtarget-s, and from signal sig1 representative of voltage Vbus.

As an example, circuit AMP3 comprises:
an input terminal 508 configured to receive signal Vtarget'-s, terminal 508 being coupled, preferably connected, to terminal 506 of circuit CIRC4;
an input terminal 509 configured to receive signal sig1, terminal 509 being coupled, preferably connected, to terminal 317 of circuit CIRC1; and
an output terminal 510 configured to deliver signal cmd, terminal 510 being coupled, preferably connected, to terminal 314 of circuit CIRC1.

Figure 4:
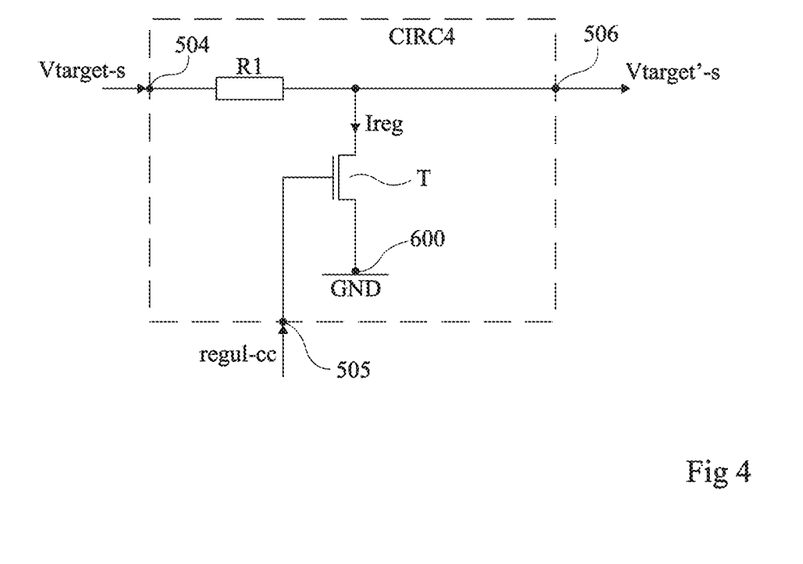
FIG. 4 shows an embodiment of a portion of the circuit of FIG. 3.

FIG. 4 shows an embodiment of the circuit CIRC4 of the circuit CIRC1 of FIG. 3.

In this embodiment, circuit CIRC4 comprises a resistor R1 and a transistor T, for example, a MOS transistor or metal oxide semiconductor transistor, and more particularly an N-channel MOS transistor in the present example. Resistor R1 is connected between terminals 504 and 506. Transistor T is connected between terminal 506 and a node 600 configured to receive reference potential GND. A control terminal of transistor T is coupled, preferably connected, to terminal 505 of circuit CIRC4. In other words, transistor T is controlled by signal regul-cc.

In the present example, the higher the value of signal, or voltage, regul-cc, the more transistor T is conductive, and the higher a current Ireg in transistor T. Thus, the more the value of signal regul-cc increases, the more the value of Vtarget'-s decreases with respect to that of signal Vtarget. In the present example, a decrease in the value of signal Vtarget'-s with respect to that of signal Vtarget corresponds to a decrease in value Vtarget' with respect to the set point value Vtarget determined by the negotiated power. In the present example, current Ireg is representative of a difference between value Vtarget and value Vtarget' to which the voltage Vbus is regulated.

Figure 5:
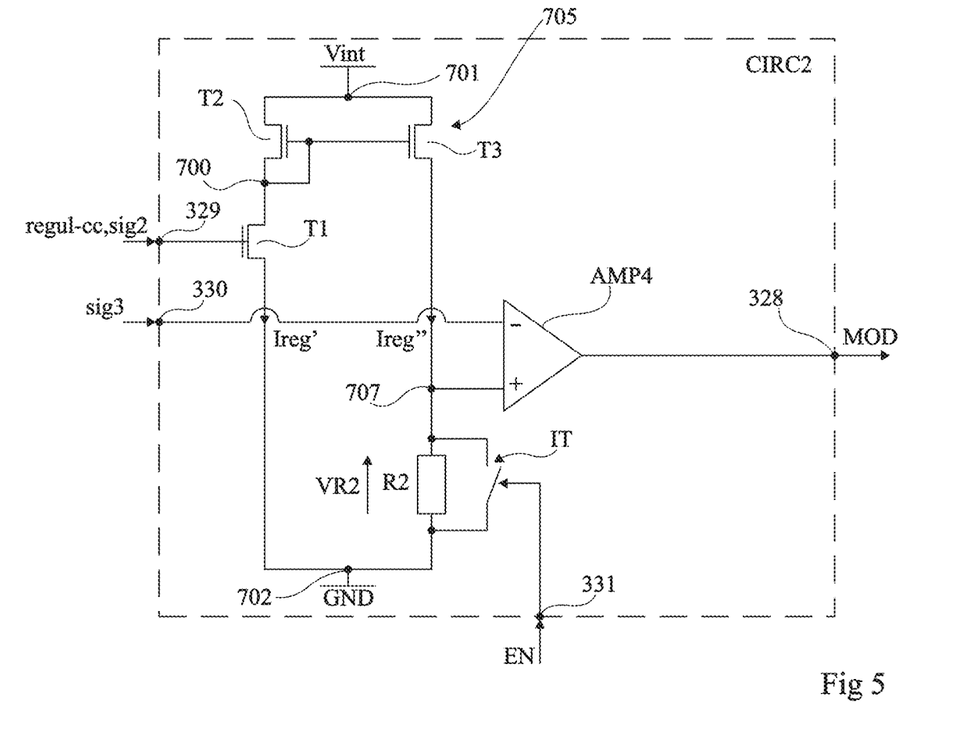
FIG. 5 shows an embodiment of another circuit of the interface of FIG. 2.

FIG. 5 shows an embodiment of the circuit CIRC2 of the interface of FIG. 2.

In this embodiment, the signal sig2 is representative of a difference between value Vtarget and value Vtarget' to which the voltage Vbus is regulated, and is thus representative of the voltage Vbus. More particularly, in the present example, signal sig2 corresponds to signal regul-cc (FIG. 3). Further, in the present example, signal sig3 is representative of the difference between set point value Vtarget and the value of threshold Vth, and thus of threshold Vth. Signal sig3 is for example provided by a voltage source, for example controlled by the circuit CTRL (FIG. 2).

In this embodiment, when signal EN is in the first state, circuit CIRC2 is configured to provide signal MOD so that the difference between value Vtarget and value Vtarget' at which the voltage Vbus is regulated is identical to the difference between value Vtarget and threshold Vth. Said otherwise, when signal EN is in the first state and current I is greater than or equal to threshold Vth, circuit CIRC2 is configured to modified the gain of the current feedback loop of the interface so that voltage Vbus is regulated to the value Vth.

In this embodiment, circuit CIRC2 comprises a transistor T1, preferably a MOS transistor, preferably with an N channel, connected between a node 700 and a node 702 configured to receive reference potential GND, node 700 being coupled to a node 701 configured to receive an internal power supply potential Vint from interface 214. A control terminal of transistor Ti is coupled, preferably connected, to terminal 329. In other words, transistor Ti is controlled by signal sig2, that is, signal regul-cc in the present example. Thus, a current Ireg' in transistor Ti is determined by signal regul-cc, current Ireq' being thus proportional, preferably equal, to current Ireg (FIG. 4). Current Ireg' is thus representative of the difference between values Vtarget and Vtarget'.

Circuit CIRC2 further comprises a resistor R2 and a current mirror 705 configured to deliver, to resistor R2, a current Ireg" which is an image of current Ireg', for example, a current Ireg" equal to current Ireg'.

Current mirror 705 for example comprises a MOS transistor T2, for example, a P-channel MOS transistor, having its source connected to node 701, and its drain connected to its gate and to node 700, as well as a MOS transistor T3, for example, a P-channel MOS transistor, having its source connected to node 701, its gate connected to node 700, and its drain coupled, preferably connected, to a node 707.

Resistor R2 is connected between node 707 and node 702. A switch IT is connected in parallel with resistor R2. Switch IT is controlled by signal EN, switch IT having its control terminal coupled, preferably connected, to terminal 331 of circuit CIRC2. Switch IT is configured to be turned off when signal EN is in the first state, and turned on when signal EN is in the second state.

Circuit CIRC2 further comprises a circuit AMP4 configured to deliver signal MOD. Circuit AMP4 delivers signal MOD based on signal sig3 and a voltage VR2 across resistor R2, that is, the voltage of node 707 referenced to node 702. Voltage VR2 is representative of the difference between value Vtarget and the value of the voltage Vbus regulated to the value Vtarget' when the switch IT is turned off.

In this example, circuit AMP4 is an error amplifier circuit comprising an operational amplifier for example having: an input, preferably inverting (−), coupled, preferably connected, to terminal 330 of circuit CIRC2; another input, preferably non-inverting (+), coupled, preferably connected, to node 707; an output configured to deliver signal MOD and coupled, preferably connected to terminal 328 of circuit CIRC2; and a feedback loop not shown, comprising here circuits CIRC2, AMP and CIRC1 (FIG. 2).

In operation, in the present example, when signal EN is in the second state, resistor R2 is bypassed and signal MOD then is at a default value, in the present example a low default value for example corresponding to reference potential GND.

Conversely, still in the present example, when signal EN is in the first state and current I is greater than or equal to threshold Ith, signal MOD is determinate based on voltage VR2 and sig3 so that difference between values Vtarget and Vtarget' is equal to difference between the value Vtarget and the value of the threshold Vth. Said otherwise, signal MOD is determinate based on signals VR2 and sig3 so that value Vtarget' is equal to Vth, and thus, so that the voltage Vbus is regulated to the value Vth.

According to an embodiment, resistance R2 is equal to resistance R1 of the circuit CIRC4 described in relation with FIG. 3, and transistors T1, T2, and T3 are configured so that current Ireg" in resistor 2 is equal to the current Ireg in the transistor T of the circuit CIRC4 of FIG. 3.

Figure 6:
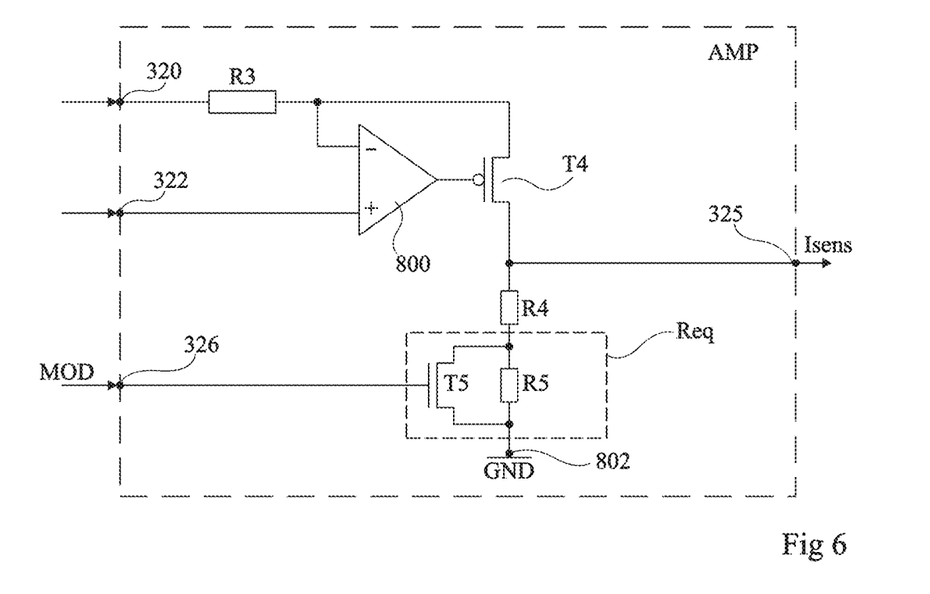
FIG. 6 shows an embodiment of still another circuit of the interface of FIG. 2.

FIG. 6 shows an embodiment of the circuit AMP of the interface 214 of FIG. 2.

Circuit AMP comprises an operational amplifier 800. Amplifier 800 has a first input, preferably non-inverting (+) coupled, preferably connected, to terminal 322 of circuit AMP, and thus to terminal 323 of resistor R (FIG. 2), a second input, preferably inverting, coupled by a resistor R3 to terminal 320 of circuit AMP, and thus to terminal 321 of resistor R (FIG. 2), and an output connected to a control terminal of a MOS transistor T4 of circuit AMP, preferably a P-channel MOS transistor T4.

Transistor T4 has a conduction terminal, preferably its source, connected to the second input of amplifier 800, and another conduction terminal, preferably its drain, connected to terminal 325 of circuit AMP. Transistor T4 is controlled by the output of amplifier 800.

Further, circuit AMP comprises two resistors R4 and R5 in series between terminal 325 of circuit AMP and a node 802 configured to receive reference potential GND. In this example, resistor R5 is connected to node 802, resistor R4 being connected to terminal 325.

Circuit AMP also comprises a MOS transistor T5, preferably an N-channel MOS transistor, connected in parallel with resistor R5. Transistor T5 is controlled by signal MOD, transistor T5 having its control terminal coupled, preferably connected, to terminal 326 of circuit AMP. The parallel association of resistor R5 and of transistor T5 forms a resistor Req (delimited in dotted lines in FIG. 6) in series with resistor R4 between terminal 325 and node 802. The value of resistor Req is controlled by signal MOD. In this example, the higher the value of signal MOD, the lower the value of resistance Req.

In the present example, gain G of circuit AMP is equal to R*(R4+Req)/R3, R being the value of the resistance R described in relation with FIG. 2. Thus, the lower the value of resistance Req, the lower the gain G of circuit AMP. The default value of gain G corresponds to the case where resistance Req is equal to resistance R5 (signal MOD at its default value —transistor T5 off).

Resistor R4 is optional, however it enables limiting of the modification of gain G based on signal MOD, that is, the minimum value that gain G can take when it is adapted based on signal MOD. In the present example, even if signal MOD has a value such that resistance Req is zero (neglecting the internal resistance of transistor T5 in the on state), gain G then has a minimum value equal to R*R4/R3. This allows limiting of the maximal value the current I can take.

Figure 7:
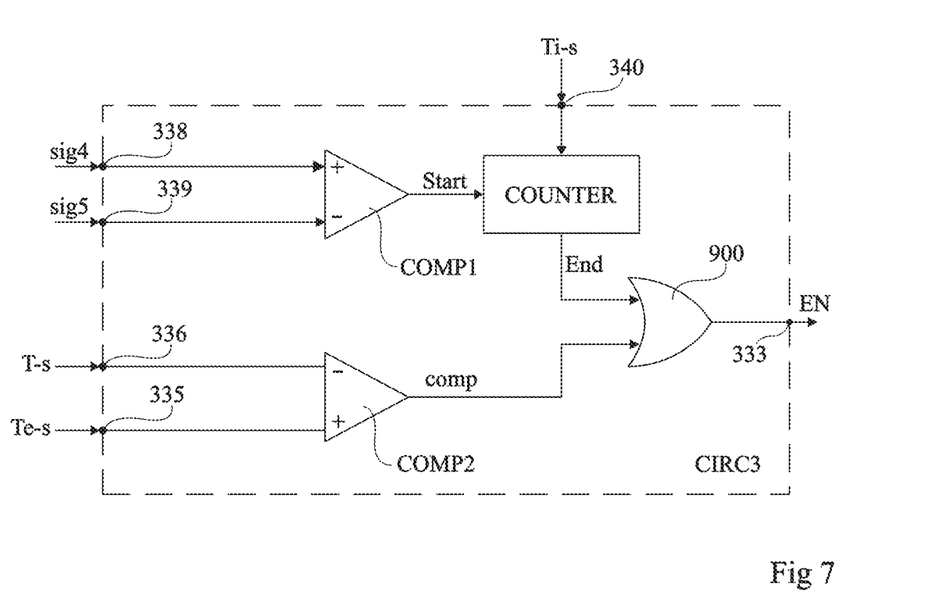
FIG. 7 shows an embodiment of still another circuit of the interface of FIG. 2.

FIG. 7 shows an embodiment of circuit CIRC3 of the interface 214 of FIG. 2.

In this embodiment, circuit CIRC3 is configured to deliver signal EN in the first state, in the present example the low state, during predetermined time period Ti from a time when voltage Vbus becomes smaller than threshold Vth and if the temperature T in interface 214 is smaller than temperature Te, and in the second state, in the present example, the high state, otherwise.

Circuit CIRC3 comprises a comparator COMP1 configured to compare voltage Vbus with threshold Vth. In this embodiment, circuit COMP1 compares voltage Vbus with threshold Vth based on the signal sig4 representative of voltage Vbus, and on the signal sig5 representative of threshold Vth. Thus, comparator COMP1 comprises:

a first input, for example, inverting (−), coupled, preferably connected, to terminal 339 of circuit CIRC3 to receive a signal, here signal sig5, representative of threshold Vth, a second input, for example, non-inverting (+), coupled, preferably connected, to terminal 338 of circuit CIRC3 to receive a signal, here signal sig4, representative of voltage Vbus, and an output configured to deliver a signal Start representative of the result of the comparison. More particularly, signal Start is in a first state, in the present example, the low state, when voltage Vbus is greater than threshold Vth, and in a second state, in the present example, the high state, when voltage Vbus is smaller than threshold Vth.

Circuit CIRC3 comprises a counter COUNTER configured to count during time period Ti from a time when signal Start switches from its first state to its second state, and to switch an output signal End of counter COUNTER at the end of time period Ti.

More particularly, signal End is:

switched from a first state, for example, the high state, to a second state, for example, the low state, when signal Start switches from its first state to its second state and the counter starts counting;

maintained in its second state as long as the counter counts during time period Ti, the switchings of signal Start being then no longer taken into account; and switched from its second state to its first state when the counter finishes counting during time period Ti.

In the illustrated embodiment, time period Ti is programmed in counter COUNTER by the signal Ti-s received on terminal 340 of circuit CIRC3.

Circuit CIRC3 comprises a comparator COMP2 configured to compare temperature T of the interface with maximum temperature Te. In this embodiment, circuit COMP2 compares temperature T with maximum temperature Te based on signal Te-s representative of temperature Te and on signal T-s representative of temperature T. Thus, comparator COMP2 comprises:

a first input, for example, inverting (−), coupled, preferably connected, to terminal 336 of circuit CIRC3 to receive a signal, here signal T-s, representative of temperature T, a second input, for example, non-inverting (+), coupled, preferably connected, to terminal 335 of circuit CIRC3 to receive a signal, here signal Te-s, representative of temperature Te, and an output configured to deliver a signal comp representative of the result of this comparison. More particularly, signal comp is in a first state when temperature T is higher than temperature Te, and in a second state when temperature T is lower than temperature Te.

As an example, the value of signal T-s decreases when temperature T increases and the value of signal Te-s is selected so that the value of signal T-s is greater than that of signal Te-s as long as temperature T is lower than temperature Te, and so that the value of signal T-s is smaller than that of signal Te-s when temperature T is higher than temperature Te. In the present example, when the inverting and non-inverting inputs of comparator COMP are connected to the respective terminals 335 and 336, the first state of signal comp is in a high state and the second state of comp is in a low state.

Circuit CIRC3 further comprises a logic gate 900 configured to deliver signal EN from signals End and Start. Gate 900 is configured to deliver signal EN in its first state, in the present example, the low state, only if signal End is in its second state, in the present example, the low state, and if signal comp is in its second state, in the present example, the low state, and to deliver signal EN in its second state, in the present example, the high state, otherwise. Thus, in the present example, gate 900 is an OR gate, having an input receiving signal End, having another input receiving signal comp, and having its output delivering signal EN and is connected to terminal 333 of circuit CIRC3.

It will be within the abilities of those skilled in the art to adapt the above-described circuit CIRC3 to the embodiment where signal EN is in the first state when temperature T is lower than temperature Te, and in the second state otherwise, as well as to the embodiment where signal EN is in the first state during predetermined time period Ti from a time when voltage Vbus becomes smaller than threshold Vth, and in the second state otherwise.

Figure 8:
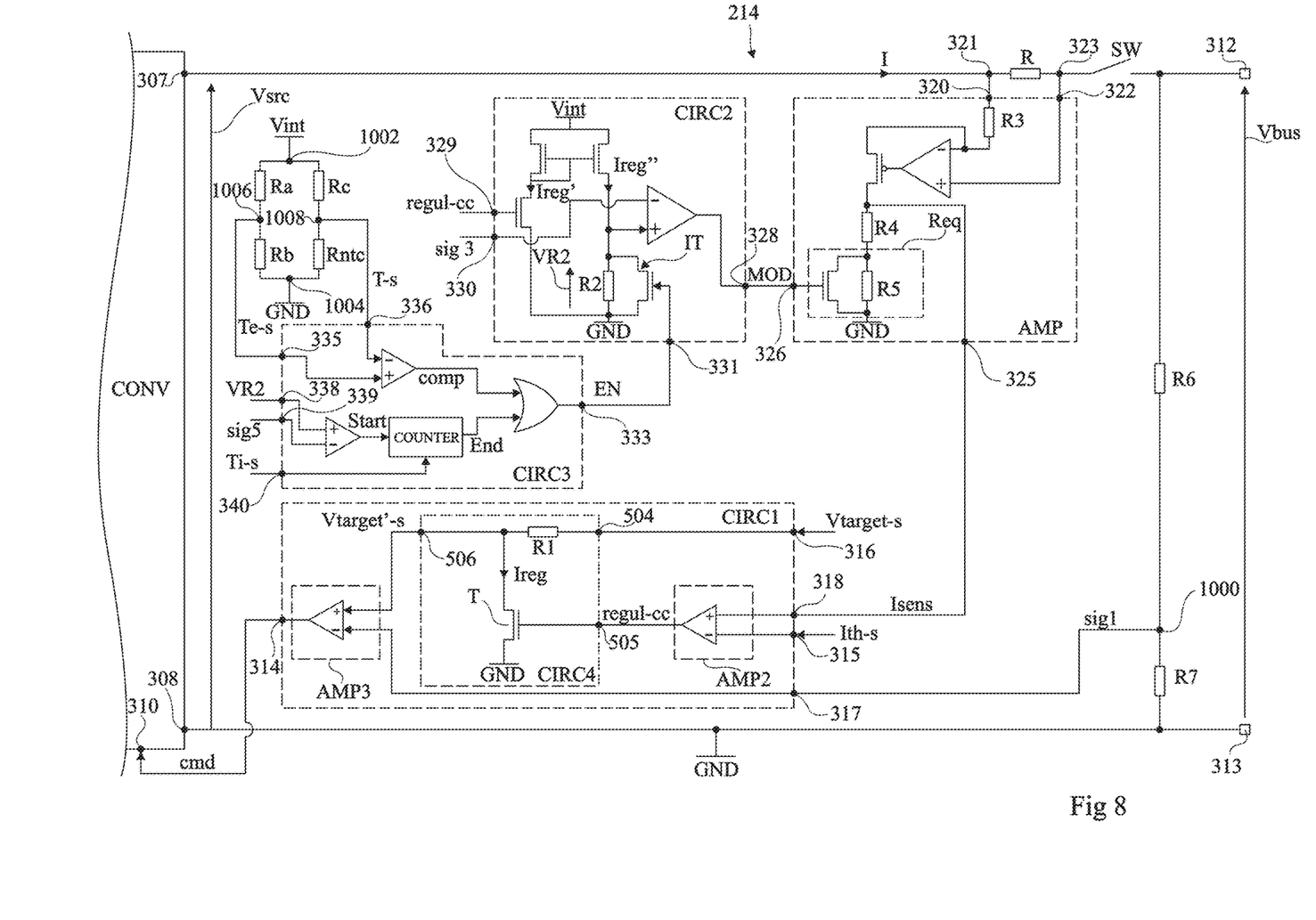
FIG. 8 shows in further detail an embodiment of the interface of FIG. 2.

FIG. 8 shows, in further detail, an embodiment of interface 214 of FIG. 2.

In this embodiment, interface 214 (partially shown) comprises circuits CIRC1, CIRC2, CIRC3, CIRC4, and AMP such as described in relation with the respective FIGS. 3, 5, 7, 4, and 6.

Further, in this embodiment:

the signal (sig4 in FIG. 2) received by terminal 338 of circuit CIRC3 is the voltage VR2 across resistor R2 of circuit CIRC2;

signals sig5 and sig3 are identical and are representative of the difference between reference value Vtarget and threshold Vth;

the signal sig1 representative of voltage Vbus is delivered by a voltage dividing bridge comprising two resistors R6 and R7 in series between terminals 312 and 313, resistor R7 being connected to terminal 313 and signal sig1 being available on the connection node 1000 between resistors R6 and R7;

the signal sig2 received by terminal 329 of circuit CIRC2 is signal regul-cc;

the switch IT of circuit CIRC2 is implemented by an N-channel MOS transistor;

signal Te-s is available on a node 1006 of connection between a resistor Ra and a resistor Rb series-connected between a node 1002 configured to receive the internal power supply potential Vint of interface 214, and a node 1004 configured to receive reference potential GND, resistor Ra being connected between nodes 1006 and 1002;

signal T-s is available on a node 1008 of connection between a resistor Rc and a resistor Rntc series-connected between nodes 1002 and 1004, resistor Rntc being a negative temperature coefficient resistor and being connected between nodes 1008 and 1002;

circuit AMP2 is implemented by an operational amplifier having its inverting input (−) connected to terminal 315 of circuit CIRC1, having its non-inverting input (+) connected to terminal 318 of circuit CIRC1, and having its output connected to terminal 505 of circuit CIRC4; and circuit AMP3 is implemented by an operational amplifier having its inverting input (−) connected to terminal 317 of circuit CIRC1, having its non-inverting input (+) connected to terminal 506 of circuit CIRC4, and having its output connected to terminal 314 of circuit CIRC1.

As an example, the following case is considered, where:

resistors R2 and R1 have the same value;

currents Ireg, Ireg', and Ireg" are identical;

signal Ith-s is equal to Ginit*Ith, where Ginit is the default value of gain G;

resistors R6 and R7 are selected so that signal sig is equal to Vbus/A; and signal Vtarget-s is equal to Vtarget/A, A being for example equal to 10.

In operation at constant voltage, signal Isens is equal to Ginit*I and is smaller than signal Ith-s equal to Ginit*Ith. As a result, signal regul-cc is at a low value such that the transistor T of circuit CIRC4 is off. Current Ireg is zero and signal Vtarget'-s is equal to signal Vtarget-s and is thus representative of reference value Vtarget. Circuit CIRC1 delivers signal cmd determined based on the difference between signals Vtarget'-s and sig1, so that converter CONV is controlled to deliver a voltage Vbus at value Vtarget.

In operation at constant current, it is first considered that signal EN is in its second state and that circuit CIRC2 delivers signal MOD at its default value, for example due to the fact that voltage Vbus is still greater than threshold Vth. Signal Isens is then equal to Ginit*I, and signal regul-cc determines the difference between values Vtarget and Vtarget' so that current I is regulated to the value of the threshold Ith. Said otherwise, signal regul-cc ensures the constant current regulation. If current I tends to increase above the threshold Ith, the value of signal regul-cc increases, which results in a corresponding increase of current Ireg and a decrease in the value of signal Vtarget'-s equal to Vtarget-s−R1*Ireg. Due to the fact that circuit CIRC1 delivers a signal cmd determined based on the difference between signals Vtarget'-s and sig1, converter CONV is then controlled to deliver a voltage Vbus at a value Vtarget' lower than value Vtarget, for example, at a value equal to Vtarget−A*R1*Ireg.

Still in operation at constant current, while current I is regulated to value Ith, it is considered that the value Vtarget' reaches threshold Vth or, in other words, that voltage Vbus reaches threshold Vth. Signal EN then switches to its first state. As a result, signal MOD then modulate gain G so that the difference between the values Vtarget and Vtarget', that is the difference between the value Vtarget and the voltage Vbus regulated to the value Vtarget', is equal to the difference between value Vtarget and threshold Vth. Thus, when signal EN is in the first state and the current I is greater than or equal to Ith, gain G is modulated so that voltage Vbus is regulated to the value Vth. As a result, the voltage Vbus does not fall under the threshold ULO, as long as signal EN is in its first state.

When signal EN switches back to its second state, the gain G of circuit AMP is no longer modulated by circuit CIRC2 and the interface recovers an operation where an increase of current I may result in voltage Vbus becoming smaller than the UVLO threshold, and thus in interface 214 turning off its switch SW before, for example, implementing a new negotiation of the power to be delivered to a load.

Various embodiments and variants have been described. Those skilled in the art will understand that certain features of these embodiments can be combined and other variants will readily occur to those skilled in the art. In particular, the implementation of interface 214 is not limited to the embodiment of the circuits CIRC1, CIRC2, CIRC3, CIRC4, and AMP described in relation with FIGS. 2 to 8. Indeed, in an operation at a constant current, it will be within the abilities of those skilled in the art to provide other circuits enabling, when signal EN is in its first state, to modulate the gain of a circuit delivering a signal representative of the current in resistor R based on which a set point value of voltage Vbus so that voltage Vbus remains greater than the UVLO threshold is modified. For example, although a signal sig1 equal to a fraction of voltage Vbus has been described in relation with FIG. 8, signal sig1 could have been equal to a fraction of voltage Vsrc.

Finally, the practical implementation of the described embodiments and variations is within the abilities of those skilled in the art based on the functional indications given hereinabove.

What is claimed is:

1. A power supply interface comprising:
a converter configured to receive a power supply voltage, the converter comprising a first terminal configured to deliver a first direct current (DC) voltage;
a first resistor and a first switch in series between the first terminal and an output terminal of the interface configured to deliver a second DC voltage;
a first circuit configured to receive a first signal and to deliver a second signal representative of a difference between the second DC voltage and a voltage threshold when the first signal is in a first state, and a default value when the first signal is in a second state;
a second circuit configured to deliver a third signal representative of a value of a first current in the first resistor multiplied by a gain of the second circuit, and to modify the gain based on the second signal; and
a third circuit configured to deliver a control signal for controlling the converter based on a current threshold, on a first target value of the second DC voltage, on a current value of the second DC voltage, and on the third signal.

2. The interface according to claim 1, comprising a fourth circuit configured to deliver the first signal in the first state for a predetermined time period after the second DC voltage reaches the voltage threshold and/or when a temperature in the interface is lower than a maximum temperature.

3. The interface according to claim 2, wherein the fourth circuit comprises:
a counter configured to count during the predetermined time period after a switching of a starting signal for starting the counter, and to switch an output signal of the counter once the predetermined time period has elapsed; and
a first comparator of a signal representative of the voltage threshold and of a signal representative of the current value of the second DC voltage, configured to deliver the starting signal; and/or
a second comparator configured to deliver a signal representative of a comparison of a signal representative of the maximum temperature and of a signal representative of the temperature in the interface,
the first signal being determined from the output signal of the counter and/or from the signal representative of the comparison.

4. The interface according to claim 1, intended to power a load, the interface being configured to negotiate a power to be delivered to the load, selectable from a predefined list of powers, the negotiated power determining the current threshold, the first target value, and the voltage threshold.

5. The interface according to claim 4, further comprising a fourth circuit configured to deliver the first signal in the first state for a predetermined time period after the second DC voltage reaches the voltage threshold and/or when a temperature in the interface is lower than a maximum temperature,
wherein the negotiated power also determines the predetermined time period and/or the maximum temperature.

6. The interface according to claim 1, wherein the first, second, and third circuits are configured so that, when the first signal is in the first state, the control signal of the converter is such that the current value of the second DC voltage remains greater than or equal to the voltage threshold.

7. The interface according to claim 1, wherein the third circuit comprises:
 a fifth circuit configured to deliver, based on the third signal, a fourth signal representative of a difference between the current threshold multiplied by a second default value of the gain of the second circuit and the value of the first current multiplied by the gain of the second circuit;
 a sixth circuit configured to deliver a fifth signal representative of a second target value equal to the first target value modulated by the fourth signal; and
 a seventh circuit configured to deliver the control signal based on a difference between the second target value and the current value of the second DC voltage.

8. The interface according to claim 7, wherein the sixth circuit comprises a second resistor connected between a first node configured to receive a seventh signal representative of the first target value and a second node configured to deliver the fifth signal, and a first transistor connected between the second node and a third node of application of a reference potential, a control terminal of the first transistor being configured to receive the fourth signal.

9. The interface according to claim 7, wherein the first circuit comprises:
 a first assembly comprising a third resistor and a switch connected in parallel, a control terminal of the switch being configured to receive the first signal;
 an eighth circuit configured to deliver to the first assembly a second current determined by the fourth signal; and
 a ninth circuit configured to deliver the second signal based on a voltage across the third resistor and on a signal representative of a difference between the first target value and the voltage threshold.

10. The interface according to claim 1, wherein the second circuit comprises:
 an operational amplifier;
 a fourth resistor connected between a terminal of the first resistor coupled to the converter and a first input of the operational amplifier, a second input of the operational amplifier being coupled to a further terminal of the first resistor coupled to the output terminal of the interface;
 a second assembly comprising a second transistor, a fifth resistor and a sixth resistor series-connected between the first input of the amplifier and a node of application of a reference potential; and
 a third transistor connected in parallel with the sixth resistor and having a control terminal configured to receive the second signal,
 wherein the second transistor has a control terminal coupled to an output of the amplifier, a first conduction terminal coupled to the first input of the amplifier, and a second conduction terminal configured to deliver the third signal.

11. The interface according to claim 10, wherein the control terminal of the second transistor is directly connected to the output of the amplifier.

12. The interface according to claim 10, wherein the first conduction terminal is directly connected to the first input of the amplifier.

13. A method implemented in a power supply interface comprising a converter receiving a power supply voltage and having a first terminal delivering a first direct current (DC) voltage, and a first resistor and a first switch in series between the first terminal and an output terminal of the interface delivering a second DC voltage, the method comprising:
 delivering, with a first circuit of the interface receiving a first signal, a second signal representative of a difference between the second DC voltage and a voltage threshold in response to the first signal being in a first state, or a default value in response to the first signal being in a second state;
 delivering, with a second circuit of the interface, a third signal representative of a first current in the first resistor multiplied by a gain of the second circuit;
 modifying the gain of the second circuit based on the second signal; and
 delivering, with a third circuit of the interface, a control signal for controlling the converter determined based on a current threshold, on a first target value of the second DC voltage, on a current value of the second DC voltage, and on the third signal.

14. The method according to claim 13, wherein the first signal is in the first state during a predetermined time period after the second DC voltage reaches the voltage threshold and/or in response to a temperature in the interface being lower than a maximum temperature.

15. The method according to claim 14, wherein, during a power negotiation with a load to be powered coupled to the interface, the interface selects a power from a predefined list of powers, the negotiated power determining the current threshold, the first target value, and the voltage threshold.

16. The method according to claim 15, wherein, during the power negotiation with the load to be powered coupled to the interface, the interface further selects the predetermined time period.

17. The method according to claim 15, wherein, during the power negotiation with the load to be powered coupled to the interface, the interface further selects the maximum temperature.

18. The method according to claim 13, wherein, in response to the first signal is in the first state, the third circuit controls the converter so that the current value of the second DC voltage remains greater than or equal to the voltage threshold.

19. The method according to claim 13, wherein the control signal is determined based on a difference between a second target value and the current value of the second DC voltage, and the second target value is equal to the first target value modulated based on a difference between the third signal and a signal representative of the current threshold multiplied by a second default value of the gain of the second circuit.

20. The method according to claim 13, wherein the first signal is in the first state.

* * * * *

UNITED STATES PATENT AND TRADEMARK OFFICE
CERTIFICATE OF CORRECTION

| | |
|---|---|
| PATENT NO. | : 11,710,976 B2 |
| APPLICATION NO. | : 17/187478 |
| DATED | : July 25, 2023 |
| INVENTOR(S) | : Alexandre Pons et al. |

It is certified that error appears in the above-identified patent and that said Letters Patent is hereby corrected as shown below:

In the Specification

Column 1, Line 7; delete "U.S. Provisional" and insert --French--.

Signed and Sealed this
Third Day of October, 2023

Katherine Kelly Vidal
*Director of the United States Patent and Trademark Office*